Jan. 22, 1963 W. BENES 3,074,506
MUFFLER FOR INTERNAL COMBUSTION ENGINE
Filed June 15, 1959 3 Sheets-Sheet 1
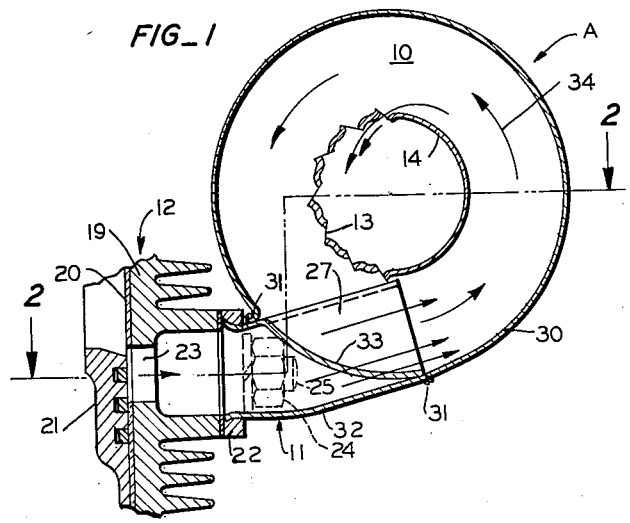
FIG_1
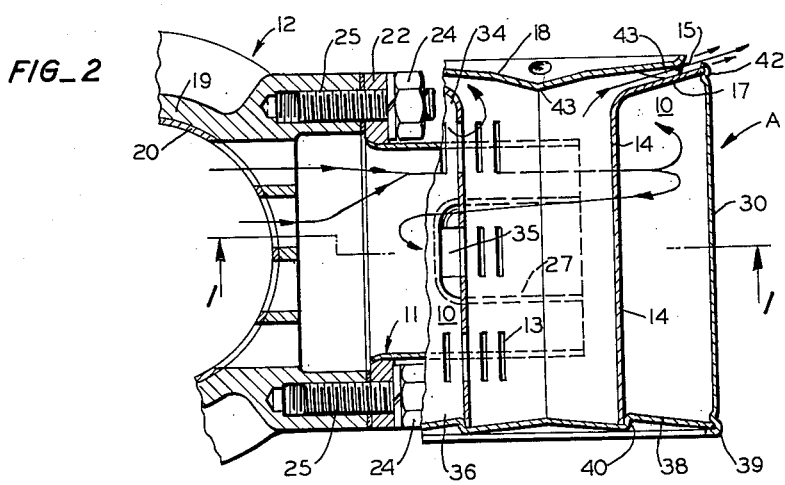
FIG_2
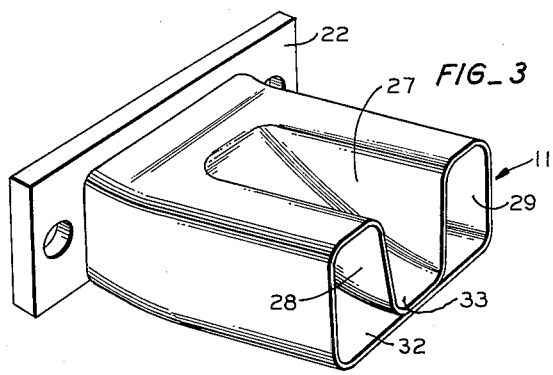
FIG_3
INVENTOR.
WENSEL BENES
BY
Hansen and Lane
ATTORNEYS Jan. 22, 1963  W. BENES  3,074,506
MUFFLER FOR INTERNAL COMBUSTION ENGINE
Filed June 15, 1959  3 Sheets-Sheet 2
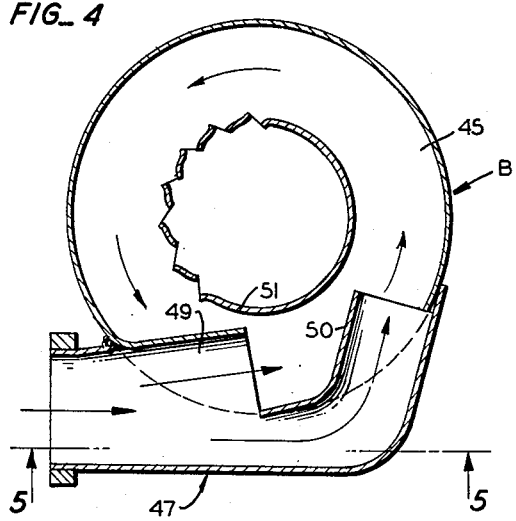
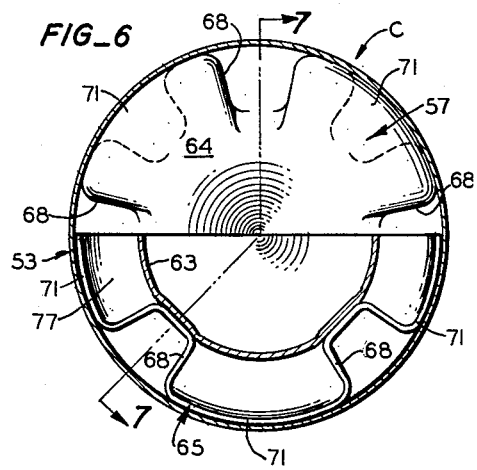
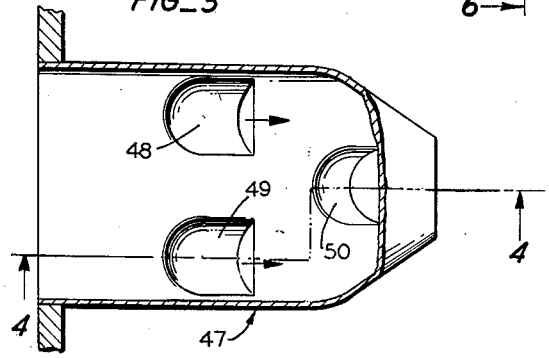
INVENTOR.
WENSEL BENES
BY
ATTORNEYS

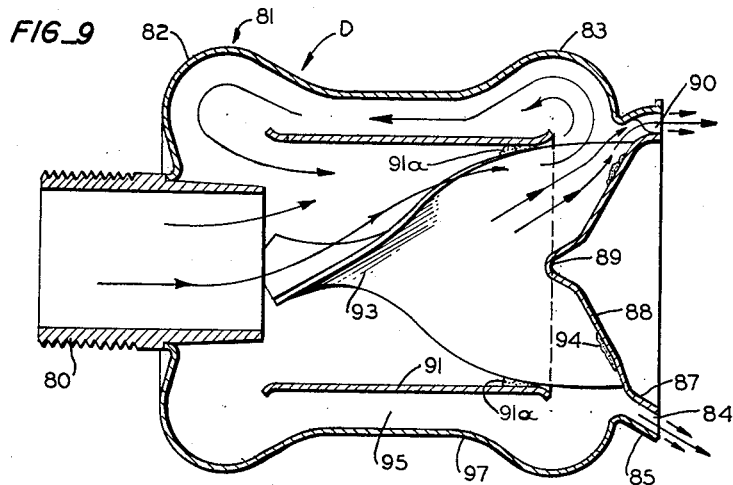
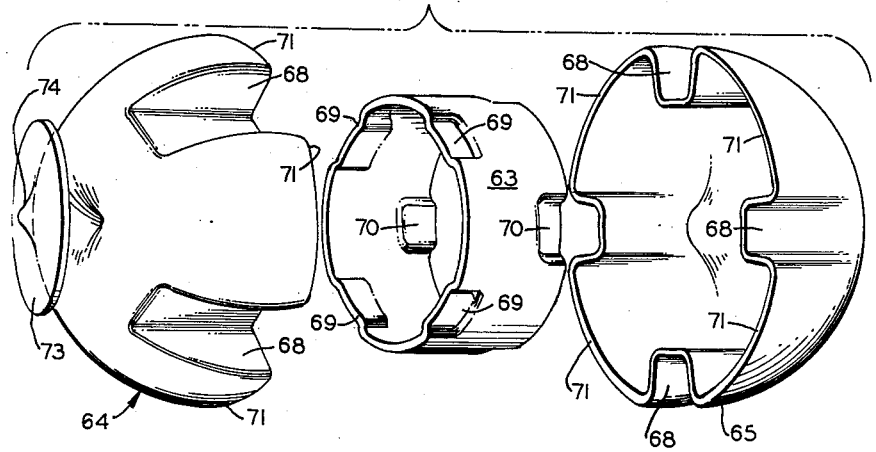

United States Patent Office 3,074,506
Patented Jan. 22, 1963

3,074,506
MUFFLER FOR INTERNAL COMBUSTION ENGINE
Wensel Benes, 12440 Hill Top Drive, Los Altos Hills, Calif.
Filed June 15, 1959, Ser. No. 820,300
5 Claims. (Cl. 181—58)

The present invention relates to a muffler for an internal combustion engine, and pertains more particularly to a muffler wherein the kinetic energy of the discharge gases is employed to cushion the sounding impact of such gases upon their release from a cylinder at the initiation of each exhaust cycle from such cylinder, and also to assist in scavenging the exhaust gases from such cylinder.

An object of the present invention is to make an improved muffler for an internal combustion engine.

The invention also provides a muffler having a swirl chamber wherein the kinetic energy of successive charges of exhaust gas creates a circulation of the gases within the chamber, which gases are directed past the opening from a protruding gas inlet nozzle into the chamber to exert an injector-like sucking effect which assists in scavenging the gases from the cylinder at the terminal end of each exhaust discharge.

A further object of the invention is to provide a muffler having an annular swirl chamber, and means for directing the exhaust gases from an engine cylinder through protruding nozzle means into said chamber and substantially tangentially thereto, thereby to create a swirling and mixing of the gases within the chamber about an axis transversely of their direction of discharge into the chamber, so that each successive exhaust charge enters the rapidly swirling mass of gas in the same direction, thereby to reduce the sounding impact of such exhaust charge, the gases being discharged from the chamber through an opening provided therein.

These, and other objects and advantages of the invention, will be apparent from the following description and the accompanying drawings wherein:

FIG. 1 is a fragmentary, sectional view through a muffler embodying the invention as it appears when mounted on an internal combustion engine, the view being taken along line 1—1 of FIG. 2.

FIG. 2 is a sectional view taken along line 2—2 of FIG. 1.

FIG. 3 is an enlarged, perspective view of the inlet nozzle portion of the muffler shown in FIG. 1.

FIG. 4 is a sectional view taken along line 4—4 of FIG. 5, showing a modified form of inlet nozzle for embodiment in a swirl chamber generally similar to that shown in FIGS. 1 and 2.

FIG. 5 is a sectional view taken along line 5—5 of FIG. 4.

FIG. 6 is a sectional view taken along line 6—6 of FIG. 7, and shows a further modified form of the invention.

FIG. 7 is a sectional view taken along line 7—7 of FIG. 6.

FIG. 8 is an exploded view of the inner chamber assembly of the muffler shown in FIGS. 6 and 7.

FIG. 9 is a sectional view of a further modified form of muffler embodying the invention.

Briefly, a muffler A (FIGS. 1–3) embodying the invention comprises an annular swirl chamber 10 mounted on the discharge end of a double channeled exhaust nozzle 11 from an internal combustion engine 12. The nozzle 11 enters the annular chamber 10 substantially tangentially thereto, so that the kinetic energy of the exhaust gases discharged through the nozzle 11 into the chamber 10 cause a high velocity swirling movement of the gases around the path indicated by the curved arrows in these figures. The gases are vented from the chamber 10 through a plurality of louvered slots 13 in a tubular inner chamber wall 14, and exit to atmosphere through a gap 15 (FIG. 2) between a flared end portion 17 of the inner chamber wall 14 and an end cap 18.

Referring to the drawings in detail, the illustrative fragment A of an internal combustion engine is of conventional, air cooled, two-stroke-cycle type, having a usual finned cylinder wall 19, cylinder liner 20, and piston 21. The exhaust nozzle 11 is provided with a mounting flange 22 which is secured to register the nozzle with the exhaust port 23 of the cylinder 19 by a pair of nuts 24 screwed onto a pair of threaded studs 25, provided one at each side of the exhaust port.

The exhaust nozzle 11 is of suitable material, for example sheet steel tubing, and has a depressed central portion 27 for dividing the outlet end of the nozzle into two discharge channels 28 and 29. The nozzle 11 which is narrower than the axial length of the swirl chamber 10 is fitted centrally into the outer chamber wall 30 and is sealed thereto as by welding 31. The lower or outer wall 32 of the nozzle 11 is substantially tangent to the annular outer wall 30 of the swirl chamber 10 at their line of juncture, and the terminal portions of the tops or inner sides of the channel portions 28 and 29 are substantially tangent to the cylindrical inner wall 14 of the chamber. Thus, the exhaust gases from the nozzle 11 enter the swirl chamber 10 substantially tangentially thereto.

The depressed bottom portion 33 of the depression 27 between the channels 28 and 29 is curved to conform substantially with the outer wall 30 of the swirl chamber, and since the width of the nozzle 11 is less than the axial length of the swirl chamber in which it is centered, three complete annular paths 34, 35 and 36 (FIG. 2) are provided within the swirl chamber past the discharge end of the exhaust nozzle.

An end closure disc 38 is secured in one end of the swirl chamber outer wall 30 by a seam 39, and a concentric, embossed central portion 40 formed concentrically in the disc 38, fits onto one end of the inner chamber wall 14.

The outwardly flaring flange 17 on the other end of the inner chamber wall 14 has its peripheral edge seamed to the outer chamber wall 30 at 42.

The end cap 18 is of sheet metal of a diameter corresponding to that of the swirl chamber 10, and a plurality of embossments 43 formed in the cap 18 are spot welded to the flared inner wall flange 17 to space the cap from the flared portion and thus to provide the gap 15 for the escape of the exhaust gases to the atmosphere. The path of the exhaust gases through the muffler A (FIGS. 1 and 2) is indicated by arrows.

The operation of the muffler A shown in FIGS. 1–3 is as follows: Each charge of exhaust gases discharged from the engine 12 as the piston 21 uncovers the exhaust port 23, passes through the exhaust nozzle 11 and the channels 28 and 29 therein and enters the swirl chamber 10 between the outer chamber wall 30 and inner chamber wall 14 at high velocity and substantially tangentially thereto. The kinetic energy of these rapidly moving gases causes them to swirl rapidly around within the swirl chamber 10 along the paths 34, 35 and 36 (FIG. 2) and past the exit ends of the channels 28 and 29.

This high velocity discharge is in the nature of an explosion, and exists for only a small fraction of a second. During the terminal portion of each exhaust discharge, the velocity of the exhaust gases from the cylinder drops to less than that of the swirling gases in the swirl chamber. Thereupon, the high velocity movement of the swirling gases in the swirl chamber exert a suction or injector action on the ends of the channels 28 and 29, and thereby assist in the scavenging of the cylinder.

During the high speed swirling of the gases in the chamber 10 they are constantly vented through the slotted openings 13 in the inner chamber wall 14, and thence exit to the atmosphere through the gap 15.

Since at normal operating engine speeds only a small fraction of a second passes between successive exhaust discharges from the engine 12, upon each exhaust discharge swirling gases will remain in the chamber 10 from the preceding discharge.

These swirling gases, moving at a speed approaching that of the fresh incoming gases, tend to absorb each successive exhaust discharge without substantial change in velocity. Since the noise incident to an unmuffled exhaust discharge is due principally to the sudden impact between exhaust gases discharged at high speed into static or slowly moving gases, the absorption of each incoming exhaust charge by gases moving at high speed in the same direction tends to greatly reduce the noise of such discharge, and thereby provides an effective muffler.

In the modified form B of the invention shown in FIGS. 4 and 5, the swirl chamber 45 is substantially identical with the swirl chamber 10 of FIGS. 1 and 2. The exhaust nozzle 47, however, instead of having a pair of exhaust channels 28 and 29 formed therein, is provided with three inwardly offset exhaust louvers 48, 49 and 50. These louvers extend inwardly toward the central wall 51 of the swirl chamber, but, being smaller, individually, than the two channels 28 and 29 of the exhaust stack 11 shown in FIG 3, permit adequate circulation of the swirling gases within the chamber 45. Otherwise, the operation of the form B of the invention shown in FIGS. 4 and 5 is identical with that shown in FIGS. 1–3.

In a further modified form C of the invention shown in FIGS. 6, 7 and 8 a muffler housing 53 has a threaded connection 54 thereon for screwing onto the discharge end of an engine exhaust stack 55. This exhaust stack is assumed to communicate with the exhaust port (not shown) of an internal combustion engine. An inner swirl chamber assembly 57, shown in exploded perspective in FIG. 8, is fitted into the housing 53 and is secured therein between an internal bear 58 formed in the housing wall 59, and a cap 60 fitted within, and spot welded to, a plurality of inward embossments 61 formed in the housing wall to space the cap from the housing wall and thus to provide an escape gap 62 for the exhaust gases passing through the muffler.

The inner assembly 57, the elements of which are shown in exploded form in FIG. 8, comprises a tubular central portion 63 of substantially smaller diameter than the housing 53, and a pair of similar, bowl shaped members 64 and 65, mounted in relatively reversed position one on each end thereof. Each bowl shaped member 64 and 65 is of a size to fit snugly within the housing 53, as shown in FIGS. 6 and 7, and has a generally conical inward embossment 67 formed co-axially in the bottom thereof, and four symmetrically spaced indented channels 68 in the side thereof.

The two ends of the tubular central member 63 are each provided with four similar positioning recesses 69 and 70, respectively, adapted for interfitted reception of the four indented channel portions 68 of the bowl shaped end members 64 and 65.

The positionin grecesses 69 in one end of the tubular member 63 are offset rotatively from those 70 in the other end thereof by angles of 45°. Thus, when the two bowl shaped end members 64 and 65 are assembled on the central tubular member 63 as shown in FIGS. 6 and 7, with the indented channels 68 of each bowl shaped end member fitted into the positioning recesses 69 and 70, respectively, each indented chanel 68 will be longitudinally aligned with an unindented bulge portion 71 between a pair of the channels 68 of the other bowl shaped end member.

A metal disc 73, having a low, generally conical central protuberance 74 thereon, is secured over the depression 67a in the outward side of the embossment 67 in the bottom of the first bowl shaped member 64. The protuberance 74 is directed axially toward the exhaust stack 55 to deflect the incoming exhaust gases from the exhaust stack radially outwardly around the first bowl shaped end member 64 and through the indented channels 68 therein.

The central portion 75 of the cap 60 is of generally conical shape and is fitted into the indented central recess 67a of the second bowl shaped member 65.

The course of the gases within and through the muffler C of FIGS. 6–8 is indicated by arrows in FIG. 7. Exhaust gases discharged through the exhaust stack 55 enter the housing 53 where they are diverted radially outwardly by the conical disc 73 and the rounded bottom of the first bowl shaped member 64. Thence they pass, in four jet blast streams, through the four indented channels 68 in the side of the first bowl shaped member 64 and travel at high velocity along the space 77 between the tubular central member 63 and the housing wall 59.

Since, due to the 45° rotative offset between the bowl shaped end members 64 and 65, the indented channels 68 in each bowl shaped member are aligned with the between-channel bulges of the other bowl shaped member, each of the four streams of gases from the channels 68 in the first bowl shaped member 64, after traversing the space 77 enter the bulges 71 between adjacent indented channels 68 in the second bowl shaped member 65. Here the rounded form of the second bowl shaped member 65 and its inwardly projecting conical central portion 67 reverse the flow of the gases sending them centrally through the tubular member 63. As they reach the interior of the first bowl shaped member 64 their direction of flow is again reversed by the conical central projection 67 and the rounded internal form of said first bowl shaped member 64.

Thence the gases pass through the bulges 71 between adjacent indented channels 68 in said first bowl shaped member 64, and along the space 77 between adjacent streams passing from the indented channels 68 along this space. A portion of the gases thus discharged through the bulges 71 in the first bowl shaped member 64 pass through the indented channel portions 68 in the second bowly shaped member 65 and exit to the atmosphere through the gap 62, while the remainder of the gases are recirculated along the swirl path previously described. Thus there is provided a swirling mass of gases within the housing 53 which remains in motion along the paths indicated by the arrows in FIG. 7 during the short intervals between successive exhaust discharges. The kinetic energy of these swirling gases has the same effect for muffling the noise of each fresh discharge and of improving the scavenging of the cylinders of an engine as the muffler A of FIGS. 1 and 2 described previously herein.

A muffler D showing a still further modified form of the invention is shown in FIG. 9. In the muffler D a threaded nozzle 80 is connected to a swirl chamber 81 of circular cross sectional shape to protrude co-axially therein. The chamber 81 has annular bulges 82 and 83, one at each end thereof. An annular escape gap 84 for the exhaust gases is provided between an annular rim 85 at the outlet end of the chamber 81 and the rim portion 87 of a generally conical cap 88 mounted with its apex 89 directed into the chamber 81, and with its rim 87 spaced from the housing by a plurality of embossments 90, secured, as by spot welding, to the cap 88.

A tubular insert 91 of substantially smaller diameter than the chamber 81 is fitted onto a helically twisted plate 93 of the same external diameter as the internal diameter of the tubular insert 91, and is secured thereto as by welds 91a. The twisted plate 93 is mounted co-axially in the chamber 81 and its outer end is fitted onto the inner side of the cap 88 and is fixedly secured thereto as by welds 94.

The swirling path of the gases through the muffler D of

FIG. 9 is indicated by the arrows. Exhaust gases discharged through the exhaust nozzle 80 pass through the tubular insert 91, where a helical swirling motion is imparted to the gases by the twisted plate 93. After passing through the tubular insert 91 the gases are diverted radially outwardly by the conical cap 88, and a portion of the gases escape through the gap 84 between the cap 88 and the chamber rim 85. The remainder of the gases are reversed in direction by the cap 88 and the second annular bulge 83, and flow in the opposite direction along the space 95 between the insert tube 91 and the chamber wall 97. Upon reaching the opposite end of the chamber 81 the gases are again reversed within the first annular bulge 82 and are again directed back through the tubular insert 91 in their original direction and past the inner end of the exhaust stack 80, where they exert a suction or injector action on the exhaust nozzle to improve scavenging of the cylinders of an engine (not shown) upon which the muffler D is mounted. A portion of the gases continue to circulate along the swirling course indicated by the arrows within the chamber 81 between exhaust discharges and thereby produce the advantageous results described previously herein in connection with the form A of the invention shown in FIGS. 1–3.

The invention provides a muffler for an internal combustion engine wherein the kinetic energy of each incoming charge of exhaust gas creates a swirling movement of the gases which continue between successive exhaust discharges from an internal combustion engine upon which the muffler is mounted. This has the dual advantageous effect of providing a mass of gas moving at high speed in the same direction as each incoming charge for reducing the sounding impact of such incoming charge upon the gases within the muffler, and furthermore of exerting a suction or injector effect on the exhaust nozzle during the latter portion of each exhaust discharge of gases, thereby tending to evacuate the burned gases from the engine during the terminal portion of each exhaust discharge therefrom.

While I have illustrated and described a preferred embodiment of the present invention, and three modified forms thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A muffler for an internal combustion engine comprising an exhaust stack having an intake and a discharge end adapted to communicate with the exhaust port of an internal combustion engine, a swirl chamber comprising a housing of generally cylindrical shape mounted co-axially on the discharge end of said exhaust stack, an inner structure in said housing comprising a central tubular member of smaller diameter than the housing and mounted co-axially therein, a pair of rounded bowl shaped members mounted in fitted relation within the housing and one on each end of the tubular member with their open sides facing inwardly, each bowl shaped member having a plurality of radially inward indentations in the side thereof, the indentations in one bowl shaped member being out of line with those in the other, whereby gas discharged through the exhaust stack into the housing passes through channels provided by the spaces between the housing and the indentations in the bowl shaped member, and thence swirls in a recurring swirling path past the discharge end of such indentations to thereby exert an injector-like effect on such indentations during the terminal portion of each exhaust discharge from the engine, the housing having an escape opening therein for the escape of the exhaust gases therefrom.

2. An arrangement according to claim 1 wherein the indentations in the bowls are seated in indentations provided therefor in the tubular member.

3. A muffler for an internal combustion engine comprising an exhaust stack adapted to communicate with the exhaust port of an internal combustion engine, a swirl chamber comprising a cylindrical housing mounted co-axially on the outer end of the exhaust stack, a pair of bowl shaped members fitted co-axially into the housing with their concave sides facing each other, a channel between each bowl shaped member and the housing, the channel between one bowl shaped member and the housing being out of line with the channel between the other bowl shaped member and the housing, one of said channels communicating from the exhaust stack tangentially into the swirl chamber between the bowl shaped members, whereby the exhaust gases discharged from said one channel swirl in a recurring path within the chamber and past the discharge end of said one channel in the same direction as that of incoming gases from the channel to thereby exert an injector-like effect on the channel and thence on the exhaust stack during the terminal portion of each exhaust discharge from such engine, the swirl chamber having an escape opening therein through the other channel and beyond the direct line of gases discharged from the channel into the swirl chamber.

4. An arrangement according to claim 3 wherein the channel between one bowl shaped member and the housing is angularly offset rotatively about the housing axis from the other channel.

5. An arrangement according to claim 3 wherein a tubular member of smaller diameter than the housing is mounted co-axially therein and extends between, and in alignment with, the radially inward sides of said channels to assist in directing the exhaust gases along their swirling path.

References Cited in the file of this patent

UNITED STATES PATENTS

| | | |
|---|---|---|
| 965,135 | Gibson | July 19, 1910 |
| 1,240,415 | Buckwalter | Sept. 18, 1917 |
| 1,515,463 | De Lancey | Nov. 11, 1924 |
| 1,609,740 | Summers | Dec. 7, 1926 |
| 1,774,178 | Holdsworth | Aug. 26, 1930 |
| 2,016,254 | Noblitt et al. | Oct. 1, 1935 |
| 2,110,986 | Kadenacy | Mar. 15, 1938 |
| 2,139,736 | Durham | Dec. 13, 1938 |

FOREIGN PATENTS

| | | |
|---|---|---|
| 242,314 | Great Britain | Nov. 3, 1925 |
| 26,179 | Australia | Apr. 14, 1930 |
| 732,466 | Germany | Mar. 3, 1943 |